United States Patent [19]

Nachtkamp et al.

[11] Patent Number: 4,728,542

[45] Date of Patent: Mar. 1, 1988

[54] IONICALLY MODIFIED PUR SPREADING PASTES AND THEIR USE

[75] Inventors: Klaus Nachtkamp, New Martinsville, W. Va.; Wilhelm Thoma, Leverkusen; Josef Pedain, Cologne; Walter Schröer; Rolf Langel, both of Leverkusen; Klaus Noll, Cologne, all of Fed. Rep. of Germany

[73] Assignee: Bayer Aktiengesellschaft, Leverkusen, Fed. Rep. of Germany

[21] Appl. No.: 874,326

[22] Filed: Jun. 13, 1986

[30] Foreign Application Priority Data

Jun. 19, 1985 [DE] Fed. Rep. of Germany ....... 3521762

[51] Int. Cl.$^4$ .................. B05D 3/02; C08F 8/30; C08F 283/04
[52] U.S. Cl. .................. 427/389; 427/245; 427/389.9; 525/127; 525/453; 525/440; 525/457; 525/474
[58] Field of Search .......... 427/389, 389.9, 387, 427/245; 525/457, 453, 474, 440, 127

[56] References Cited

U.S. PATENT DOCUMENTS

| | | | |
|---|---|---|---|
| 3,148,173 | 9/1964 | Axelrood | 525/457 |
| 3,666,542 | 5/1972 | Kigame et al. | 427/245 |
| 3,681,125 | 8/1972 | Träubel et al. | 427/245 |
| 3,692,570 | 9/1972 | Träubel et al. | 427/245 |
| 3,718,712 | 2/1973 | Tushaus | 525/457 |
| 3,941,733 | 3/1976 | Chang | 525/457 |
| 4,008,196 | 2/1977 | Matsuda et al. | 525/457 |
| 4,206,255 | 6/1980 | Wenzel et al. | 427/393.5 |
| 4,233,359 | 11/1980 | Mimura et al. | 427/245 |
| 4,299,868 | 11/1981 | Berndt et al. | 427/389 X |
| 4,339,566 | 7/1982 | Rosenkranz et al. | 427/385.5 X |
| 4,410,667 | 10/1983 | Porter, Jr. et al. | 525/440 |
| 4,427,798 | 1/1984 | König et al. | 525/457 |
| 4,480,008 | 10/1984 | Farronato et al. | 427/385.5 X |
| 4,489,135 | 12/1984 | Drexler | 428/423 |
| 4,507,413 | 3/1985 | Thoma et al. | 524/42 |
| 4,510,186 | 4/1985 | Kurtyama et al. | 427/245 X |
| 4,594,385 | 6/1986 | Thoma | 524/839 |
| 4,601,951 | 7/1986 | Fertell et al. | 428/423.4 X |

FOREIGN PATENT DOCUMENTS

| | | |
|---|---|---|
| 1694059 | 6/1971 | Fed. Rep. of Germany . |
| 1145200 | 3/1969 | United Kingdom . |
| 1210504 | 10/1970 | United Kingdom . |
| 1248656 | 10/1971 | United Kingdom . |

*Primary Examiner*—Thurman K. Page
*Attorney, Agent, or Firm*—Gene Harsh; Joseph C. Gil; Thomas W. Roy

[57] ABSTRACT

The present invention is directed to the preparation of optionally pigmented spreading paste based on multiphase mixtures of ionically-modified polyurethanes and/or polyurethane ureas which are prepared from special synthesis components based on silicone resins, aromatic hydroxypolyethers, aromatichydroxy polyesters, and perfluorocarbon resins, the multiphase mixtures additionally containing water and organic solvents for the polyurethanes and/or polyurethane ureas. The present invention is also directed to the preparation of these optionally pigmented spreading pastes and to their use for the production of coatings permeable to water vapor on fabric or leather substrates by the direct or transfer method using the technique of evaporation.

13 Claims, No Drawings

IONICALLY MODIFIED PUR SPREADING PASTES AND THEIR USE

BACKGROUND OF THE INVENTION

1. Field of the Invention

This invention relates to new, ionically modified PUR spreading pastes, to their production and to their use for the production of coatings permeable to water vapor on fabrics or leather substrates by the direct or transfer method using the technique of evaporation coagulation.

2. Description of the Prior Art

Fabric or leather coatings highly permeable to water vapor are of increasing interest, above all in the shoe and coating fields. The advantage of coated materials such as these is that the clothing produced from them on the one hand affords optimal protection, but on the other hand allows bodily moisture to escape in the form of water vapor. These properties are extremely valuable both from the physiological and hygiene point of view and also from the point of view of wearing comfort.

An important process for producing microporous coatings permeable to water vapor is the so-called bath coagulation process described, for example, in DE-AS No. 1,270,276 and in DE-AS No. 1,769,277. In this process, a substrate is coated with a polyurethane or polyurethane urea dissolved in an organic solvent and the coated product is introduced into a bath of a non-solvent (for example water) miscible with the solvent. Coagulation of the polyurethane is obtained by extraction of the solvent by the non-solvent.

The disadvantages of this process are that very large quantities of non-solvent are required for the necessary complete removal of the solvent and that the process is time-consuming. In addition, special, relatively expensive apparatus are required for carrying out this process and also for working up the solvent/non-solvent mixtures accumulating therein.

Accordingly, there have been no shortage of attempts to produce coatings permeable to water vapor by the direct or transfer coating processes using conventional fabric coating machines. Most of these attempts are based on the so-called technique of evaporation coagulation. In principle, this process is carried out by adding a certain quantity of a less volatile non-solvent to a polymer dissolved in a volatile solvent and spreading the resulting solution, dispersion or suspension onto a substrate. The coating is dried by careful heating, during which the volatile solvent preferentially evaporates first. The result is that the polymer coagulates in the layer and, after final drying, shows a microporous structure. This process is described, for example, in DE-PS No. 1,694,059. The polyurethanes used therein are colloidally dissolved in volatile organic solvents such as tetrahydrofuran or methylethylketone and mixed with organic non-solvents having a higher evaporation index such as cleaning spirit. A similar process is described in CH-PS No. 481, 971with the added feature that water is included among the non-solvents mentioned therein for addition to the polymer solutions. Another example of this approach is the process according to DE-PS No. 2,004,276 which uses hydrophilic polyurethanes based on aromatic diisocyanates which contain certain proportions of polyoxyethylene compounds as synthesis components. Solutions of these polyurethanes in certain organic solvents such as methylethylketone are mixed with water as non-solvent and applied to a substrate, after which the coating is coagulated by selective evaporation and subsequently dried.

However, the above-mentioned processes based on the principle of evaporation coagulation also have serious disadvantages. A major disadvantage is that selective evaporation of the more volatile solvent components is time-consuming and requires extremely precise temperature control.

Accordingly, handling of the corresponding products in the coating machines is complicated and, above all, only possible at low rates of travel. Another serious disadvantage which applies in particular to the process according to DE-PS No. 2,004,276 is that the polyurethane solutions or suspensions described therein are difficult to process. Although they have low solids contents, these products are highly viscous, even before the addition of water which is made at the time of application. They are described as "sludge-like suspensions" and show a pronounced tendency towards premature drying with formation of gel particles and specks. Therefore, they are difficult to handle.

Accordingly, an object of the present invention is to provide a process for the production of coatings permeable to water vapor which may be carried out by the direct or transfer method in conventional coating machines and which does not have any of the disadvantages described in the foregoing.

This object is achieved by the process according to the invention which is described in detail hereinafter. The invention is based on the surprising observation that multi-phase, stable spreading pastes, which may be processed surprisingly easily in conventional coating machines to form microporous coatings, can be obtained from hydrophobic polyurethanes or polyurethane ureas which are dissolved in organic solvents and contain certain silicone, polyether, polyester or perfluorocarbon resin segments and, in addition, contain incorporated groups convertible into salts by the addition of certain quantities of water. The process according to the invention has the advantage that the polyurethane solutions are low in viscosity before addition of the water and, accordingly, are easy and safe to handle by the operator who prepares the ready-to-use spreading pastes shortly before application. In addition, the spreading pastes obtainable by the process according to the invention and characterized by incorporated salt-forming groups are distinguished by particularly good stability in storage and are safe to process. Finally, the microporous coatings obtained by the process according to the invention combine the requisite high permeability to water vapor with good waterproof properties.

SUMMARY OF THE INVENTION

The present invention is directed to optionally pigmented spreading pastes containing polyurethane plastics for the production of coatings permeable to water vapor on fabric or leather substrates by the direct or transfer method based on the principle of evaporation coagulation, characterized in that the spreading pastes are multiphase mixtures of (A) about 5 to 50% by weight of hydrophobic polyurethanes and/or polyurethane ureas which contain about 0.01 to 0.5% by weight, preferably about 0.05 to 0.25% by weight, of chemically incorporated groups convertible into salts wherein least a portion of the groups, preferably 0.01–0.4% by weight, are present in salt form and about 1 to 30% by weight of synthesis components containing at least two terminal and/or lateral NCO-reactive groups based on silicone resins, atomatic hydroxypolyethers aromatic hydroxypolyesters, perfluorocarbon resins or mixtures thereof, (B) 0 to about 30% by weight of hydrophobic polyurethanes and/or polyurethane ureas which contain about 0.01 to 0.5% by weight, preferably about 0.05 to 0.25% by weight of chemically incorporated groups convertible into salts wherein at least a portion of the groups are present in salt form and which are synthesized without the special synthesis components mentioned under (A).

(C) about 5 to 50% by weight of organic solvents for (A) and (B)

(D) 0 to about 40% by weight of organic non-solvents for (A) and (B), (E) 0 to about 5% by weight of crosslinking agents or hydrophobicizing agents and (F) about 10 to 70% of water.

The present invention is additionally directed to a process for preparing the spreading pastes by mixing solutions of the polyurethanes or polyurethane ureas (A) and, optionally, (B) in the organic solvents (C) (which may optionally contain the organic non-solvents (D) and component (E)), with water (F) after conversion of at least a portion of the groups capable of salt formation into salt form.

The present invention is also directed to the use of the spreading pastes in the form of mixtures of components (A) to (F) having the quantitative and qualitative composition indicated above for the production of coatings permeable to water vapor on fabric or leather substrates by the direct or transfer method based on the principle of evaporation coagulation.

DETAILED DESCRIPTION OF THE INVENTION

The polyurethanes or polyurethane ureas (A) are polyadducts obtainable in known manner from polyisocyanates and compounds containing active hydrogen atoms. However, the principal characteristic of these polymers if (1) their content of about 0.01 to 0.5% by weight, preferably about 0.05 to 0.2% by weight, of groups convertible into salts such as carboxylic acid and/or sulfonic acid groups, or tertiary amino groups and (2) their content of silicone resins, aromatic hydroxypolyethers, aromatic hydroxypolyesters and/or perfluorocarbon resins.

Starting materials for producing the polyurethanes or polyurethane ureas (A) include:

1. organic polyisocyanates, preferably diisocyanates corresponding to the formula Q(NCO)$_2$ where Q is an aliphatic hydrocarbon radical containing 4 to 12 carbon atoms, a cycloaliphatic hydrocarbon radical containing 6 to 25 carbon atoms, an aromatic hydrocarbon radical containing 6 to 15 carbon atoms or an araliphatic hydrocarbon radical containing 7 to 15 carbon atoms.

Examples of preferred diisocyanates include tetramethylene diisocyanate, hexamethylene diisocyanate, 1,4-diisocyanatocyclohexane, 3-isocyanato-methyl-3,5,5-trimethylcyclohexylisocyanate (isophorone diisocyanate), 4,4'-diisocyanatodicyclohexylmethane, 4,4'-diisocyanato-3,3'-dimethyldicyclohexylmethane, 4,4'-diisocyanatodicyclohexylpropane(2,2), 1,4-diisocyanatobenzene, 2,4- or 2,6-diisocyanatotoluene or mixtures of these isomers, 4,4'-, 2,4'- or 2,2'-diisocyanatodiphenylmethane or mixtures of these isomers, 4,4'-diisocyanatodiphenylpropane(2,2), p-xylylene diisocyanate, α,α,α',α'-tetramethyl-m- or -p-xylylene diisocyanate and mixtures of these compounds.

Particularly preferred diisocyanates (at least 50 mole % of all diisocyanates) are isophorone diisocyanate and 4,4'-diisocyanatodicyclohexylmethane.

It is of course also possible to use the higher polyisocyanates known per se in polyurethane chemistry or even modified polyisocyanates known per se, for example polyisocyanates containing carbodiimide groups, allophanate groups, isocyanurate groups, urethane groups and/or biuret groups, in the process according to the invention.

2. Water-insoluble polyhydroxyl compounds of the type known per se in polyurethane chemistry having molecular weights of 400 to about 10,000 preferably about 600 to 5000, and melting points below about 60° C., preferably below 45° C. The corresponding dihydroxy compounds are preferably used. Compounds having a functionality of 3 or higher in the context of the isocyanate polyaddition reaction may be used in small quantities to obtain a certain degree of branching. Tri-functional or higher polyisocyanates may also be used for the same purpose, as mentioned above. The polyhydroxyl compounds preferably are based on predominantly aliphatic synthesis components.

Preferred hydroxyl compounds are the hydroxypolyesters, hydroxypolyethers, hydroxypolythioethers, hydroxypolycarbonates and/or hydroxypolyester amides known per se in polyurethane chemistry.

The polyesters containing hydroxyl groups which may be used in accordance with the invention include reaction products of polyhydric, preferably dihydric and, optionally, also trihydric alcohols with polybasic, preferably dibasic carboxylic acids. Instead of using the free polycarboxylic acids, it is also possible to use the corresponding polycarboxylic acid anhydrides, corresponding polycarboxylic acid esters of lower alcohols or mixtures thereof for producing the polyesters.

The polycarboxylic acids are preferably aliphatic and/or cycloaliphatic and may optionally be substituted, for example by halogen atoms, and/or unsaturated. Examples of suitable polycarboxylic acids include succinic acid, adipic acid, suberic acid, azelaic acid, sebacic acid, tetrahydrophthalic acid anhydride, endomethylene tetrahydrophthalic acid anhydride, glutaric acid anhydride, maleic acid, maleic acid anhydride, fumaric acid and dimeric and trimeric fatty acids (such as oleic acid, optionally in admixture with monomeric fatty acids). Suitable polyhydric alcohols include ethylene glycol, 1,2- and 1,3-propane diol, 1,4- and 1,3-butane diol, 1,6-hexane diol, 1,8-octane diol, neopentyl glycol, 1,4-bis-hydroxymethyl cyclohexane, 2-methyl-1,3-propane diol, 2,2,4-trimethyl-1,3-pentane diol, glycerol, trimethylol propane, 1,2,6-hexane triol, 1,2,4-butane triol, trimethylol ethane, pentaerythritol, quinitol, mannitol, sorbitol, methyl glycoside, 1,4,3,6-dianhydrohexitols, diethylene glycol, dipropylene glycol, polypropylene glycols, dibutylene glycol and polybutylene glycols.

The polyesters may contain terminal carboxyl groups. Polyesters of lactones, for example ε-caprolactone, or hydroxy-carboxylic acids, for example ε-hydroxycaproic acid, may also be used.

The polyethers preferably containing two hydroxyl groups suitable for use in accordance with the invention are also known per se. They may be obtained, for example, by the polymerization of tetrahydrofuran and/or epoxides (such as ethylene oxide, propylene oxide, butylene oxide, styrene oxide or epichlorohydrin) on their own (for example in the presence of boron trifluoride) or by the addition of these epoxides, optionally in admixture or successively, onto starter compounds containing reactive hydrogen atoms such as alcohols and amines (for example water, ethylene glycol or propylene glycol). In order to guarantee the crucial characteristic of hydrophobicity of the polyurethane (urea)s according to the invention, the polyethers used as synthesis components should only contain at least so many ethylene oxide units that the resulting polyurethanes or polyurethane ureas contain less than about 2% by weight of oxyethylene segments —$CH_2$—$CH_2$—O—. Polyethers free from ethylene oxide are preferably used for producing the polymers according to the invention.

Polyethers modified by vinyl polymers of the type obtained, for example, by the polymerization of styrene or acrylonitrile in the presence of polyethers (U.S. Pat. Nos. 3,383,351, 3,304,273, 3,523,093, 3,110,695; DE-PS No. 1,152,526) are also suitable. The higher functionality polyethers which may also be used are similarly formed by the alkoxylation of higher functionality starter molecules such as ammonia, ethanolamine, ethylene diamine, trimethylol propane, glycerol or sucrose.

Among the polythioethers, reference is made in particular to the condensates of thiodiglycol on its own and/or with other glycols, dicarboxylic acids, formaldehyde, amino-carboxylic acids or aminoalcohols. Depending on the coreactants, the products are polythiomixed ethers, polythioether esters or polythioether ester amides.

Suitable polycarbonates containing hydroxyl groups include those known per se which may be obtained, for example, by reaction of diols such as 1,3-propane diol, 1,4-butane diol and/or 1,6-hexane diol, with phosgene or diarylcarbonates such as diphenylcarbonate.

The polyester amides and polyamides include the predominantly linear condensates obtained from polybasic, saturated and unsaturated carboxylic acids or their anhydrides and polyhydric, saturated and unsaturated aminoalcohols, diamines, polyamines and mixtures thereof. Polyhydroxyl compounds containing urethane or urea groups may also be used.

Representatives of the above-mentioned polyisocyanate and hydroxy compounds suitable for use in the process according to the invention are described, for example in High Polymers, Vol. XVI, "Polyurethanes, Chemistry and Technology" by Saunders-Frisch, Interscience Publishers, New York/London, Vol. I, 1962, pages 32–42 and pages 44–54 and Vol. II, 1964, pages 5–6 and 198–199 and also in Kunststoff-Handbuch, Vol. VII, Vieweg-Hochtlen, Carl-Hanser-Verlag, Munich, 1966, for example on pages 45 to 71.

3. Compounds containing groups convertible into salts such as carboxylic acid and/or sulfonic acid groups, or tertiary amino groups. These compounds preferably have a molecular weight of about 120 to 399 and are incorporated into the polyurethanes according to the invention in the form of compounds containing primary and/or secondary hydroxyl and/or amino groups. Examples include dimethylolpropionic acid, tartaric acid, bis-($\beta$-hydroxyethoxy)-benzoic acids, alkoxylation products of amino acids (such as bis-($\beta$-hydroxyethyl)-amino-acetic acid, bis-($\beta$-hydroxypropyl)-aminocaproic acid and bis-($\beta$-hydroxyethyl)-aminobenzoic acids), lysine, 3,5-diaminobenzoic acid, 2,5-diaminophenoxyacetic acid, reaction products of diamines with chloroacetic acid (such as bis-($\beta$-aminomethyl)-glycine), reaction products of diamines with acrylic acids (such as 2-aminoethyl-$\beta$-aminopropionic acid, 4-aminohexyl-$\beta$-aminopropionic acid and aminoisophoryl-$\beta$-aminopropionic acid), reaction products of amino acids with acrylonitrile followed by hydrogenation of the nitrile groups (such as bis-($\gamma$-aminopropyl)-glycine, bis($\gamma$-aminopropyl)-aminobutyric acid, bis($\gamma$-aminopropyl)-4-amino-benzoic acid and bis($\gamma$-aminopropyl)-4-aminocyclohexane-1-carboxylic acid), disulfonic acids (such as 1,4-butane sulfonic acid and alkoxylation products thereof), alkoxylation products of aminosulfonic acids (such as bis-($\beta$-hydroxyethyl)taurine and bis-($\beta$-hydroxypropyl)-4-aminobenzene sulfonic acid), diaminosulfonic acids (based on reaction products of diamines with $\beta$-chloroethane sulfonic acid (such as $\beta$-aminoethyl taurine, 4-aminobutyl taurine and bis-($\gamma$-aminopropyl)-taurine), and aromatic diaminosulfonic acids (such as flavonic acid, 4,4'-diaminodibenzyl-2,2'-disulfonic acid, 2,6-diaminotoluene-4-sulfonic acid).

Salt formation of the carboxylic and/or sulfonic acids and/or acids of phosphorus may be carried out using bases such as the hydroxides of the alkali metals, but is preferably carried out using ammonia, tertiary amines (such as triethylamine, tripropylamine, triethanolamine and tripropanolamine), alkylmorpholines (such as N-methylmorpholine), triethylene diamine, dimethylbenzylamines etc.

Suitable incorporable tertiary amines convertible into salts include N-alkyl dialkanolamines (such as N-methyl diethanolamine, N-ethyl dipropanolamine, N-benzyl diethanolamine, N-cyclohexyl diethanolamine and N-phenyl dipropanolamine) and N-alkyldiamines (such as N-methyldipropylene triamine).

Salt formation is carried out using quaternizing agents and/or acids such as dimethylsulfate, benzylchloride, p-toluene sulfonic acid methyl ester, phosphoric acid, acetic acid, glycolic acid, lactic acid, tartaric acid, benzoic acid, hydroxybenzoic acid and citric acid.

The compounds 3 are incorporated in (A) in amounts sufficient to provide about 0.01 to 0.5% by weight, preferably from 0.05 to 0.25% by weight, based on (A), of groups convertible into salts.

4. Compounds having a functionality of at least two in the isocyanate addition reaction selected from silicone resins, aromatic hydroxypolyethers, aromatic hydroxypolyesters and perfluorocarbon resins. More particularly, the compounds include:

(a) compounds containing polysiloxane segments which have at least two terminal and/or lateral isocyanate-reactive groups and molecular weights of 194 to about 20,000, preferably 194 to about 10,000, most preferably about 300 to 3,000. Difunctional polysiloxanes containing organofunctional terminal groups are preferably used. These compounds contain structural units having the formula, —O—Si(R)$_2$—, wherein R is a $C_1$–$C_4$ alkyl radical or a phenyl radical, but preferably a methyl radical.

Organofunctional, linear polysiloxanes suitable for use as starting material in accordance with the invention are described, for example, in DE-AS Nos. 1,114,632, 1,190,176, 1,248,287, 2,543,638 or in DE-OS Nos. 2,356,692, 2,445,648, 2,363,452, 2,427,273 or 2,558,523. The organofunctional terminal groups are preferably aliphatic hydrocarbon radicals containing a hydroxyl, carboxyl, mercapto or primary or secondary amino group and, optionally, heteroatoms such as oxygen. Preferred carbofunctional groups include primary and secondary hydroxyl groups and also secondary amino groups. Starting compounds terminated by primary hydroxyl groups are particularly preferred. The organofunctional compounds may be present in the starting materials, for example, in the form of the following carbo-functional radicals:

—CH₂—OH, —(CH₂)₄—OH, —CH₂—O—CH₂—CH₂—OH,

—CH₂—O—CH—CH₂—OH, —CH₂—S—CH₂—CH₂—,
            |
            CH₃

—CH₂SH, —CH₂—S—CH₂—CH₂—SH, —CH₂—CH₂—COOH,

—CH₂—NH₂, —(CH₂)₄—NH₂, —CH₂—NH—C₄H₉ or

—CH₂—NH—C₆H₁₁.

The organofunctional polysiloxanes contain at least 1 and preferably from 3 to 30 structural units corresponding to the formula —O—Si(R)₂— and a molecular weight of 194 to about 20,000, preferably about 300 to 3000.

According to the invention, particularly preferred starting compounds are hydroxymethyl polydimethyl siloxanes corresponding to the following general formula

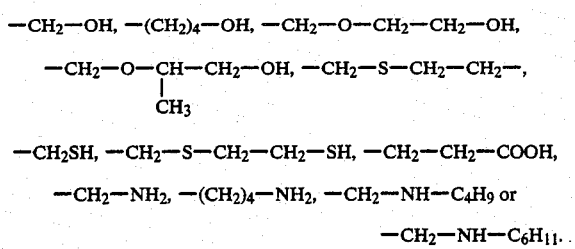

which may be obtained in known manner, for example by the process according to DE-AS No. 1,236,505.

(b) Hydroxy-functional polyethers which are produced by alkoxylation of aromatic compounds containing at least two phenolic hydroxyl groups which contain less than 10% by weight of oxyethylene segments, —CH₂—CH₂—O—, and which have molecular weights of about 26 to 3000, preferably about 300 to 2000. Difunctional polyethers of this type are preferably used. Compounds containing at least two phenolic hydroxyl groups which are suitable for use in the production of the aromatic polyethers used in accordance with the invention include hydroquinone, isomeric naphthalene diols, but preferably diols corresponding to the formula

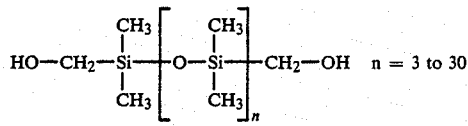

wherein X represents one of the difunctional radicals —S—, —O—, —SO₂—, —CO— or —C(R₁R₂)—, wherein R₁ and R₂ may be the same or different and represent hydrogen or C₁-C₄ alkyl radicals together form an aliphatic ring containing 5 or 6 carbon atoms. Diols in which X represents —C(R)₂— are particularly preferred and those in which X represents —C(CH₃)₂— are most preferred. The aromatic hydroxy-polyethers suitable for use in accordance with the invention are produced in known manner by polyaddition of cyclic ethers onto the aromatic polyols mentioned above. Suitable cyclic ethers include ethylene oxide, propylene oxide, butylene oxide, styrene oxide or mixtures of these compounds. When ethylene oxide is used, it should only be used in such quantities such that the resulting aromatic polyethers contain less than 10% by weight of oxyethylene segments, —CH₂—CH₂—O—, as stipulated above. Propylene oxide is preferably exclusively used.

It is apparent from the foregoing that particularly preferred aromatic hydroxypolyethers are adducts of bisphenol A and propylene oxide.

(c) Polyesters of isomeric benzene dicarboxylic acids containing at least two terminal and/or lateral hydroxyl groups and having molecular weights of about 250 to 5000 preferably about 250 to 2000 and melting points below about 150° C. Difunctional polyesters of this type are preferably used. The polyesters in question include condensates known per se of polyhydric, preferably dihydric alcohols with phthalic acid, isophthalic acid and/or terephthalic acid; these aromatic acids may optionally be substituted, for example by halogen atoms. Instead of using the free dicarboxylic acids, the corresponding carboxylic acid esters of lower alcohols or, in the case of phthalic acid,—its anhydride may of course also be used for producing the aromatic polyesters.

(d) Compounds containing perfluoroalkyl groups and at least two terminal and/or lateral isocyanate-reactive groups and having molecular weights of about 250 to 5000, preferably about 300 to 2000. It is preferred to use diols of the type mentioned which contain at least three perfluorinated carbon atoms in the form of perfluoroalkyl groups incorporated in the main chain of the diol and/or arranged laterally thereof, "perfluoroalkyl groups" being understood to be saturated, perfluorinated aliphatic radicals which may have a linear, branched or even cyclic structure. It is particularly preferred to use diols of the above-mentioned type containing lateral perfluoroalkyl groups, of the type described, for example, in German Patent Application P No. 3,319,368.1. Examples of particularly suitable synthesis components of this type are the N-sulfonyl perfluoroalkyl aminoalkanol derivatives corresponding to the formula:

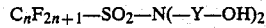

C_nF_{2n+1}—SO₂—N(—Y—OH)₂ wherein
Y is a linear or branched, saturated alkylene radical containing from 2 to 4 carbon atoms and
n is an integer of greater than 2 and preferably from 5 to 12.

The polyurethanes and/or polyurethane ureas (A) may contain about 1 to 30% by weight of the at least difunctional compounds according to (4); it is also possible to use mixtures of the special synthesis components mentioned under (4a) to (d).

5. Chain-extending agents from the group comprising polyhydroxyl and/or polyamino compounds having molecular weights of up to 399. More specifically, the compounds in question include (a) low molecular weight polyhydroxyl compounds having a molecular weight of 62 to 399, preferably 62 to about 300, such as ethane diol, 1,2- and 1,3-propane diol, 1,4- and 1,3-butane diol, neopentyl glycol and other pentane diols, 1,4-3,6-dianhydrohexitols, trimethylol propane, glycerol and pentaerythritol. It is preferred to use diols, especially alkylene diols containing 2 to 6 carbon atoms.

(b) Polyamines, hydrazine and hydrazine derivatives having molecular weights of 32 to 399, preferably 32 to about 300. The polyamines are preferably aliphatic or cycloaliphatic diamines, although trifunctional or higher functionality polyamines may also be used to obtain a certain degree of branching. Examples of suitable aliphatic polyamines are ethylene diamine, trimethylene diamine, tetramethylene diamine, hexamethylene diamine, 1,2-propylene diamine, the isomer mixture of 2,2,4- and 2,4,4-triemethylhexamethylene diamine and bis(β-aminoethyl)-amine (diethylene triamine).

The following are examples of suitable cycloaliphatic polyamines:

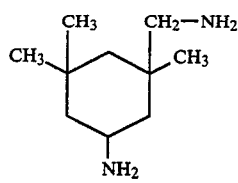

(isophorone diamine)

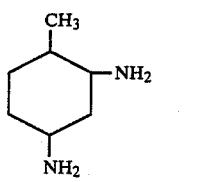 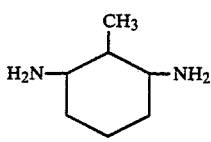

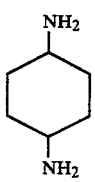 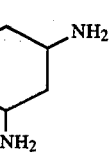

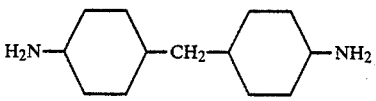

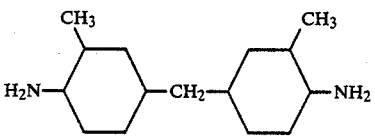

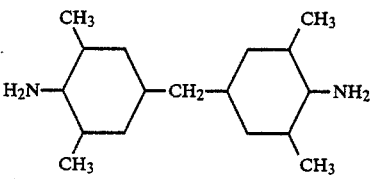

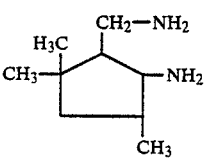

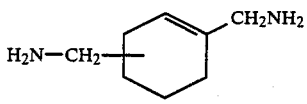

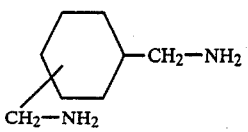

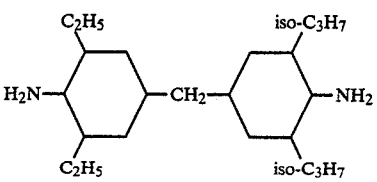

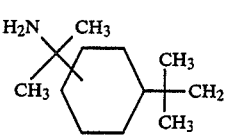

(m/p)

Araliphatic polyamines, such as for example 1,3- and -1,4-xylylene diamine or α,α,α',α'-tetramethyl-1,3-and -1,4-xylylene diamine may also be used as chain extending agents for the polyurethanes according to the invention. The preferred diamine is isophorone diamine or 4,4'-diaminodicyclohexylmethane (in quantities of preferably 50 mole % of the diamines).

Examples of suitable hydrazinic chain-extending agents are hydrazine, which should preferably be used in the form of its hydrate, and hydrazine derivatives containing at least two free hydrazinic amino groups such as carbodihydrazide, adipic acid dihydrazide, β-aminopropionic acid hydrazide or β-semicarbazidopropionic acid hydrazide.

The polyurethanes or polyurethane ureas (A) are preferably prepared by initially preparing NCO-prepolymers containing at least two terminal isocyanate groups from the polyisocyanates described under 1., the relatively high molecular weight polyhydroxyl compounds described under 2., the acidic and/or basic diols described under 3. and the isocyanate-reactive compounds from the group comprising silicone resins, aromatic polyether, aromatic polyester and/or perfluorocarbon resins described under 4. and reacting the NCO-prepolymers thus prepared in known manner with the chain-extending agents under 5.

Where the diamino acids and/or the diamines containing tert. nitrogen described under 3 are used, they are preferably employed together with the chain-extending agents described under 5. The dihydroxyacids and/or dihydroxy-tert.-amines described under 3. may also be combined for the reaction with the chain-extending agents according to 5.

The chain-extending reaction is preferably carried out in organic solution using the organic solvents mentioned hereinafter under (C). It is also possible and, in many cases, even of advantage to use mixtures of solvents and non-solvents for the polyurethanes or polyurethane ureas (A) formed as reaction product in the chain-extending reaction. In this case it must be guaranteed that the polyurethanes or polyurethane ureas (A)

dissolve, at least in colloidal form, in these mixtures. In this case, the solvents are selected from the group of solvents described hereinafter under (C) and the non-solvents from the group of non-solvents described hereinafter under (D).

When the chain-extending reaction is carried out in organic solution, the solution generally has a solids content of about 10 to 50% by weight, preferably about 20 to 40% by weight. The viscosity of the chain-extended polyurethane (urea) solution as measured at room temperature is adjusted to between about 10,000 and 100,000, preferably between about 20,000 and 60,000 mPas at 25° C. To guarantee good viscosity stability, it is advisable to add monofunctional chain terminators such as the oximes described in DE-OS No. 3,142,706, after the desired solution viscosity has been reached.

In principle, it is also possible to prepare the polyurethanes or polyurethane ureas (A) in known manner in the melt using suitable mixing units (such as reaction screws) and to dissolve the solids obtained after cooling, (for example in the form of granulates) in the above-mentioned solvents or solvent/non-solvent mixtures to prepare the spreading pastes according to the invention.

The type of starting materials used in the production of (A) and the quantities in which they are used are selected in such a way that the resulting polyurethanes or polyurethane ureas (A) contain about 0.01 to 0.5% by weight, preferably about 0.05 to 0.25% by weight of groups convertible into salts according to 3. and about 1 to 30% by weight, preferably about 1 to 20% by weight of polymer segments which are formed through the incorporation of at least one of the silicone resins, aromatic hydroxypolyethers, aromatic hydroxy-polyesters and perfluorocarbon resins described above. In a particularly preferred embodiment, component (A) consists of polyurethane ureas produced from (1) about 10 to 40% by weight of the polyisocyanates described above under 1, (2) about 40 to 80% by weight of the relatively high molecular weight polyhydroxyl compounds described above under 2, (3) a quantity of the compounds containing groups convertible into salts described above under 3. and their associated salt formers such that about 0.05 to 0.25% by weight of groups convertible into salts are present, (4) about 1 to 18% by weight of the special synthesis components described above under 4. which may contain one or more of the following (a) 0 to about 15% by weight of the silicone resins described above under (4.a)

(b) 0 to about 15% by weight of the aromatic hydroxypolyethers described above under (4.b), or (c) 0 to about 15% by weight of the aromatic hydroxypolyesters described above under (4.c), and (d) 0 to about 15% by weight of the perfluorocarbon resins containing NCO-reactive terminal groups described above under (4.d), (5a) 0 to about 20% by weight of the low molecular weight polyhydroxyl compounds described above under (5.a) and/or (5b) about 2 to 20% by weight of the polyamines and/or hydrazines described above under (5.b), the percentages of synthesis components (3 to 5) amounting to between about 3 and 20%.

In addition to component (A), component (B) may optionally be used as a second polyurethane (urea) in the formulation of the spreading pastes according to the invention. Component (B) is based on polyurethanes or polyurethane ureas synthesized in exactly the same way as (A), except that they do not contain the special polymer segments which are formed through incorporation of the above-described compounds 4. Accordingly, component (B) may be produced from the same range of starting materials described above in reference to the production of component (A), except for the special synthesis components mentioned under (4.a) to (d).

The organic solvents (C) suitable for use in accordance with the invention are liquid, volatile organic compounds with which stable solutions of the polyurethanes or polyurethane ureas (A) and (B) may be prepared. In this context, the term "solutions" comprises not only optically clear polymer solutions, but also non-sedimenting organic solution systems containing colloid or microgel components. The solvents in question are preferably alcohols and ketones containing from 4 to 6 carbon atoms, particularly isobutanol and/or methylethylketone.

The organic non-solvents (D) suitable for use in accordance with the invention are liquid, volatile organic compounds with which stable solutions of the polyurethanes or polyurethane ureas (A) and (B) cannot be prepared unless further auxiliaries are added. These non-solvents are preferably aromatic and aliphatic hydrocarbons containing 6 to 10 carbon atoms and fatty acid esters containing 3 to 7 carbon atoms. Particularly preferred non-solvents are toluene, the isomeric xylenes and the commercial mixtures of relatively high boiling hydrocarbons known as "solvent naphtha."

In addition to the principal components (A) to (D) mentioned thus far, the spreading pastes according to the invention may optionally contain standard coating auxiliaries (E) such as crosslinking agents and/or hydrophobicizing agents. Suitable crosslinking agents, which may be used in particular for improving the fastness of the coatings produced from the spreading pastes to cleaning processes include melamine-formaldehyde resins, blocked or free polyisocyanates, and epoxy resin-polyamine combinations, optionally with addition of esterification catalysts. Standard commercial fluorocarbon resins may be added as hydrophobicizing agents, particularly when the polyurethane (urea) (A) does not contain any of the fluorine-containing synthesis components described above under (4.d). Standard thickeners, UV stabilizers, light stabilizers, stabilizers against nitrogen oxides, pigments, dyes or fillers may also be used in the usual quantities.

The spreading pastes according to the invention contain the components in the quantities specified above, but preferably the following quantities are used: about 5 to 30% by weight of (A), 0% by weight of (B), about 5 to 40% by weight of (C), about 5 to 40% by weight of (D), about 0.5 to 5% by weight of (E) and about 20 to 60% by weight of (F).

The spreading pastes are prepared by mixing an organic hydrophobic polyurethane phase with an aqueous phase to form a stable, multiphase emulsion-like mixture. As described above, the organic phase preferably contains the polyurethane (urea) (A) and optionally (B), the organic solvent (C), optionally the organic non-solvent (D) and optionally the coating auxiliaries (E).

The water (F) is added completely or in part to the solution of the polyurethane ureas (A) and/or (B) in the solvents (C), optionally with complete or partial addition of the non-solvents (D). The salt formers required for salt formation in (A) and/or (B) may be incorporated completely or in part before addition of the water, although they may also be completely or partly present in the water.

The coating auxiliaries (E) may be incorporated in the spreading pastes before, during or after addition of the water.

Mixing of the organic and aqueous phases to prepare the spreading pastes according to the invention may be carried out in stirring units of the type normally used in the coating field, such as for example dissolvers or dispersers. Accordingly, the spreading pastes may be prepared without difficulty from the organic and aqueous starting products described above by the user of these coating systems. The ready-to-use pastes are distinguished by high homogeneity and good stability in storage and may therefore be safely processed.

If necessary, the spreading pastes may also be applied in pigmented form. In that case, it is preferred to pigment the spreading pastes themselves, although it is also possible to pigment the starting products such as the organic polyurethane solutions. Organic and inorganic pigments of the type normally used in the coating of fabrics may be used for this purpose.

To carry out the process according to the invention, the spreading pastes described in the foregoing are either directly knife-coated onto fabric or leather substrates by standard fabric-coating techniques or are processed by the transfer process, i.e. are initially coated onto optionally patterned release papers or stencils. The quantities applied range from about 10 to 200 g/m², preferably about 15 to 75 g/m² (solids). The coatings are then exposed to temperatures of about 40° to 120° C., preferably about 50° to 80° C. in the drying tunnel of the fabric-coating machine, the temperature optionally being increased in successive stages. Coagulation occurs through selective evaporation of the solvents.

In the transfer process, drying of the first coat (top coat) is followed by application of a second coat (coupling layer), after which the fabric substrate is laminated on and dried before removal of the release paper. In the direct coating process, too, it is of advantage to knife-coat a second layer (in this case the top coat) onto the dried, first layer (in this case the undercoat). The spreading pastes suitable for the top coat are again the spreading pastes according to the invention as described above and may contain the polyurethanes used in the first coat or different polyurethanes. In the transfer process, the second coat may even consist of conventional dispersion- or solution-type coupling products which are preferably foamed mechanically or by means of blowing agents. When it is produced from a spreading paste according to the invention, the second coat is dried under the same conditions as the first coat. In principle, it is also possible by the process according to the invention to produce coatings of three or more layers wherein the surface layer may even be a compact layer of low weight, for example about 3 to 15 g/m², preferably about 4 to 6 g/m².

The coagulation or drying times per layer are about 1 to 3 minutes, enabling the coating machines used to operate at comparatively high speeds in relation to other evaporation coagulation processes. If thermosetting cross-linking agents are added to the spreading pastes, the drying process must be followed by cross-linking at elevated temperatures, for example at temperatures of about 120° to 200° C., preferably about 140° to 160° C.

The coatings obtained by the process described in the foregoing show high permeability to water vapor, mostly in the technically highly desirable range of about 1 to 15 mg/cm².h, preferably about 2–10 mg/cm².h, and are highly waterproof and show outstanding resistance to aging and to cleaning processes. The correspondingly coated fabrics or leathers are suitable, for example, for the production of high-quality sports clothing and rainwear, sports and leisure goods and shoe materials.

The invention is illustrated by the following examples in which the percentages quoted are percentages by weight, unless otherwise indicated.

EXAMPLES

The coating tests cited in the Examples were carried out by the following methods:
 resistance to water, DIN 53,886, measured in mm water column (mm WC)
 permeability to water vapor, IUP 15 (DIN 53,333), measured in mg/cm².h
 Scrubb test, SNV 198,498 (SNV=Swiss Standards Association).

EXAMPLE 1

I. Preparation of the polyurethane urea solution (A)

1660 g of a polyester of diethylene glycol and adipic acid (OH Number 44), 30 g of an $\alpha,\omega$-bis-hydroxymethyl polydimethyl siloxane (OH number 100) and 3.5 g of dimethylol propionic acid were dehydrated and then reacted with 580 g of isophorone diisocyanate. An NCO-value of 5.1% (theoretical 5.3%) was reached after a reaction time of 2 hours at 100° C. The prepolymer thus obtained was diluted with 3300 g of toluene and cooled to 25° C. A solution of 260 g of isophorone diamine in 3300 g of isobutanol was added dropwise to the resulting solution with thorough stirring. When a viscosity of 30,000–40,000 mPas had been reached, the chain-extending reaction was stopped by the addition of 40 g of butanone oxime. After stirring for 2 hours at 50° C., a 30% polyurethane urea solution having a viscosity (at 25° C.) of approx. 30,000 mPas was obtained.

II. Preparation of the undercoat paste 800 g of the solution described in 1/I were diluted with 240 g of toluene. 12 g of a 75% solution of a blocked polyisocyanate having a blocked NCO-content of approx. 10% (described in DE-OS No. 3,313,236, Example 4) and 12 g of a 50% aqueous melamine resin solution (hexamethoxymethyl melamine) were then added which resulted in the formation of a homogeneous, stable solution having a viscosity (at 25° C.) of approx. 10,000 mPas. 40 g of a 10% aqueous solution of triethanolamine were stirred into this organic solution. Finally, 760 g of water were added with vigorous stirring. A white, two-phase spreading paste having a solids content of approx. 15% and a viscosity (at 25° C.) of approx. 10,000 mPas was obtained.

III. Preparation of the top coat paste 800 g of the solution described in 1/I were diluted with 240 g of toluene. 20 g of the 50% aqueous melamine resin solution described in 1/II were then added which resulted in the formation of a homogeneous, stable solution having a viscosity (at 25° C.) of approx. 10,000 mPas.

4.0 g of the 10% triethanolamine solution described in 1/II were stirred into this solution and, finally, 760 g of water were added with vigorous stirring. A white, two-phase spreading paste having a solids content of approx. 14% and a viscosity of approx. 10,000 mPas was obtained.

IV. Direct coating

Substrate polyamide:

An approx. 100 g/m$^2$ polyamide fabric was coated with undercoat paste 1/II using an air knife. The working conditions were as follows:

Drying temperature: 70° C./80° C./80° C.
Rate of travel (15 m tunnel): 6 m/min.
Coating weight (dry): 5 g/m$^2$ Using the top coat paste 1/III, the top coat was applied in the second spreading unit consisting of doctor rolls:

Roll gap: 0.23 mm
Drying temperature: 70° C./70° C./70° C.
Subsequent crosslinking at: 140°-160° C.
Coating weight (dry): 20 g/m$^2$ The coating had a total weight of 25 g/m$^2$ and the article was distinguished by high resistance to water and high permeability to water vapor.

| Resistance to water | |
|---|---|
| original | 1300 mm WC |
| 30° C. wash 1 × | 1050 mm WC |
| 30° C. wash 3 × | 900 mm WC |
| dry cleaning 1 × | 900 mm WC |
| dry cleaning 3 × | 700 mm WC |
| Permeability to water vapor | 5 mg/cm$^2$ · h |
| Scrubb test, 1000 strokes, wet | no damage |

(WC = water column)

V. Transfer coating (a) Spreading paste for the top coat permeable to water vapor: 1000 g of the water-containing top coat paste described in 1/III were pigmented with 25 g of ACRAMIN-brown FRL (Bayer AG).

(b) Spreading paste for a thin intermediate coat (state-of-the-art): 1000 g of the polyurethane urea solution described in 1/I were diluted with 150 g of toluene and 150 g of isobutanol and pigmented with 40 g of ACRAMIN-brown FRL.

(c) Spreading paste for a coupling layer permeable to water vapor: 1000 g of the water-containing undercoat paste described in 1/II were pigmented with 25 g of ACRAMIN-brown FRL.

(d) Mechanical foam (prepared by mechanically foaming the dispersion) for a foamed coupling layer (state-of-the-art): a mixture of 500 g of the aqueous polyurethane dispersion described hereinafter and 500 g of the aqueous polyacrylate dispersion described hereinafter, 6 g of a 50% aqueous ammonium stearate solution, 10 g of a 25% aqueous polyacrylic acid dispersion (Mirox-AM, Stockhausen/Krefeld, West Germany) and 20 g of a 50% aqueous melamine resin solution (hexamethoxymethyl melamine) were adjusted to pH 9 with concentrated aqueous ammonium solution and beaten with a high-speed stirrer to form a mechanical foam (500 g/l). Composition of the polyurethane dispersion: 82.4% of a polyester of 1,6-hexane diol, neopentyl glycol and adipic acid (OH number 66; ratio by weight of hexane diol to neopentyl glycol=65:35), 14.6% of hexamethylene diisocyanate, 2.4% of the sodium salt of 2-aminoethyl-2-aminoethane sulfonic acid and 0.6% of ethylene diamine: solids content 40% dispersed in water.

Composition of the polyacrylate dispersion: 96% of butylacrylate, 1% of itaconic acid, 2.5% of acrylamide and 0.5% of N-methylolacrylamide: solids content 40% dispersed in water.

(e) Article of two coats: Spreading paste (a) was knife-coated onto a commercial release paper in the first spreading unit of a 15 m long tandem coating machine:

Roll Gap: 0.18 mm
Drying temperature: 70° C./70° C./70° C.
Residence time in the drying tunnel: 2.5 mins.
Coating weight (dry): 15 g/m$^2$ Paste (c) was applied in the second coating unit (roll gap 0.25 mm), after which a teased cotton fabric weighing approx. 140 g/m$^2$ was applied.

Drying temperature: 60° C./70° C./90° C.
Subsequent crosslinking at: 150°-160° C.

A soft, supple article having a total coating weight of approx. 35 g/m$^2$ and a permeability to water vapor of 8 mg/cm$^2$.h was obtained and was suitable for the production of lightweight outer clothing.

(f) Article of two coats: The dispersion beating foam paste (d) was applied to the dried top coat described in (e) in the second spreading unit (roll gap 0.3 mm). The cotton substrate described in (e) was then applied. The coupling layer was dried successively at 80° C./120° C./160° C. A soft, full article having a total coating weight of approx. 60 g/m$^2$ and a permeability to water vapor of 10 mg/cm$^2$.h was obtained.

(g) Article of three coats: The spreading paste (b) was knife-coated onto a commercial release paper in the first spreading unit of a three-coat machine and a thin, compact pre-top coat (weight 6 g/m$^2$) was produced by drying at 60° to 120° C.

Using paste (a), the top coat permeable to water vapor was applied by knife coating in the second spreading unit. Working conditions were the same as described in (e): coating weight (dry): 15 g/m$^2$.

The mechanical foam (d) (prepared by mechanically foaming the dispersion) was applied as coupling layer in the third spreading unit (roll gap 0.3 mm). The cotton substrate described in (e) was then applied. The coupling layer was dried successively at 80° C./120° C./160° C. A soft, very full article having a total coating weight of approx. 65 g/m$^2$ and a permeability to water vapor of 6 mg/cm$^2$.h was obtained.

EXAMPLE 2

I. Preparation of polyurethane urea solution (A)

2100 g of a polyester of diethylene glycol and adipic acid (OH number 44), 74 g of an α,ω-bis-hydroxymethylpolydimethyl siloxane (OH number 200) and 3.5 g of 2,2-dimethylol propionic acid were reacted at 100° C. with 580 g of isophorone diisocyanate to an NCO-value of 4.8%.

The prepolymer thus obtained was diluted by the addition of 2400 g of toluene and cooled to 20° C. Immediately before the beginning of chain extension which then followed, the solution was further diluted with 1600 g of isobutanol. Chain extension:

A separately prepared solution of 300 g of 4,4'-diamino-dicyclohexylmethane in a mixture of 1200 g of toluene and 1200 g of isobutanol was quickly added to the cooled prepolymer solution with thorough stirring. 950 g of isobutanol were then gradually added with increasing viscosity. After a viscosity of 30,000 to 40,000 mPas had been reached, chain extension was stopped by the addition of 30 g of butanone oxime.

After stirring for 1 hour at 50° C., a clear solution having a viscosity (at 25° C.) of 40,000 mPas was obtained.

II. Preparation of polyurethane urea solution (B)

2100 g of a polyester of diethylene glycol and adipic acid (OH Number 44) and 3.5 g of dimethylol propionic acid were reacted at 90°–100° C. with 500 g of isophorone diisocyanate to an NCO content of 5.0%.

As in (I.) the NCO prepolymer was diluted with 1700 g of toluene and cooled to 20° C. 1700 g of isobutanol were added shortly before the beginning of the reaction with the diamine solution.

For chain extension, a solution of 330 g of 4,4′-diamino-diphenylcyclohexylmethane (H12MDA) dissolved in 1700 g of toluene and 1700 g of isobutanol was added with thorough stirring. After a viscosity of approx. 40,000 mPas had been reached, the reaction was stopped by the addition of 30 g of butanone oxime. The 30% solution had a viscosity (at 25° C.) of 35,000 mPas.

III. Preparation of the undercoat paste 600 g of the PUR solution (A) described in 2/I and 200 g of the PUR solution (B) described in 2/II were mixed and diluted with 200 g of toluene. 15 g of the blocked polyisocyanate described in Example 1/II and 5 g of an epoxy resin (LEKUTHERM X 50, Bayer AG, D-5090 Leverkusen) were then added to this dilute solution. In addition, 2.5 g of a 10% aqueous solution of N-methylmorpholine were stirred in to neutralize the COOH groups. 760 g of water were then added in portions with vigorous stirring. This spreading paste had a solids content of approx. 14% and a viscosity of approx. 10,000 mPas/25° C.

IV. Preparation of the top coat paste 700 g of the PUR solution described in 2/I were diluted with 140 g of ethylacetate and 100 g of toluene. 20 g of the 50% aqueous melamine resin according to Example 1/II and 5 g of a silicone resin (SILOPREN E 50, Bayer AG) were added to this solution. 10 g of a 10% aqueous ammonia solution were then added for salt formation. To prepare the paste, 750 g of water were finally mixed in. The approx. 15% spreading paste had a viscosity (25° C.) of approx. 15,000 mPas.

V. Direct coating

An approx. 90 g/m² polyamide fabric was coated with the undercoat paste 2/III using an air knife. The working conditions in a 15 m long drying tunnel were as follows:
Drying temperature: 70° C./80° C./100° C./150° C.
Rate of travel: 8 m/min.
Coating weight (dry): 5 g/m²

The top coat paste 2/IV was applied by doctor rolls in the second spreading unit:
Drying temperature: 70° C. throughout the tunnel
Roll gap: 0.30 mm
Coating weight (dry): 27 g/m²

After crosslinking (1 min/160° C.), the article was hydrophobicized (PERLIT SE, 30 g/l, PERLIT SI/SW, 20 g/l).

| Resistance to water | |
|---|---|
| original | 1500 mm WC |
| 30° C. wash 1 × | 1000 mm WC |
| 30° C. wash 3 × | 900 mm WC |
| drycleaning 1 × | 800 mm WC |
| drycleaning 3 × | 700 mm WC |
| Permeability to water vapor | 5 mg/cm² · h |
| Scrubb test, 1000 strokes, wet | no damage |

EXAMPLE 3

I. Preparation of polyurethane urea solution (A)

1750 g of the polyester described in 1/I, 150 g of the α, ω-bis-hydroxymethylpolydimethyl siloxane described in 1/I, 82 g of perfluoroethyl sulfonic acid-N-[bis-(2-oxyethyl)]-amide and 1.5 g of tartaric acid were reacted with 465 g of isophorone diisocyanate. An NCO value of 3.5% (calculated 3.8%) was reached after a reaction time of 3 hours at 80° to 90° C. The NCO prepolymer was diluted with 2100 g of toluene, cooled to room temperature and reacted with a solution of 135 g of 1,4-xylylene diamine in 1000 g of toluene and 3000 g of isobutanol to form a polyurea paste. After a viscosity of approx. 40,000 mPas/25° C. was reached, 20 g of butanone oxime were added to stop the reaction. After stirring for 3 hours at 50° C., the 30% solution had a viscosity (at 25° C.) of 35,000 mPas.

II. Preparation of polyurethane urea solution (B)

2475 g of the polyester described in 1/I and 1.5 g of tartaric acid were reacted with 466 g of isophorone diisocyanate as in 3/I, NCO value 2.9% (calculated 3.15%). The NCO prepolymer was diluted with 2600 g of toluene and reacted at room temperature with 135 g of 1,4-xylylene diamine in 100 g of toluene and 3600 g of isobutanol. After a viscosity of 40,000 mPas (at 25° C.) had been reached, the reaction was stopped by the addition of 20 g of butanone oxime as in 3/I.

III. Preparation of the undercoat paste 900 g of the PUR solution (A) described in 3/I and 100 g of the PUR solution (B) described in 3/II were mixed and diluted with 400 g of toluene. 15 g of the polyisocyanate used in Examples 1 and 2 g of a 5% solution of triethylamine in water were added to this dilute solution. Finally, 900 g of water were incorporated in portions with vigorous stirring. The approx. 16% spreading paste had a viscosity of approx. 15,000 mPas/25° C.

IV. Preparation of the top coat paste 800 g of the PUR solution (A) described in 3/I were diluted with 240 g of toluene. 20 g of a 50% aqueous melamine resin according to 1/II, 2 g of a 5% aqueous triethylamine solution and 5 g of a 40% solution of the fluorocarbon resin (Scotchgard FC-326, a 3M product) were added and, finally, 750 g of water were incorporated with intensive stirring. The approx. 14% spreading paste had a viscosity of 10,000 mPas at 25° C.

V. Direct coating

An approx. 140 g/m² cotton fabric was hydrophobicized by standard methods (using PERLIT SE 30 g/l and PERLIT SI/SW 20 g/l, Bayer AG) and, after removing excess hydrophobizing agent was coated while still moist with the undercoat paste 3/III using an air knife.
Drying temperature: 70° C./80° C./100° C.
Rate of travel: 6 m/min. (15 m-tunnel)

Coating weight (dry): 7 g/m²
The top coat paste 3/IV is applied by doctor rolls in the second spreading unit.
Roll gap: 0.35 mm
Drying temperature: 70° C./70° C./70° C.
Subsequent crosslinking at: 140°–160° C.
Coating weight (dry): 28 g/m²

| Resistance to water | |
| --- | --- |
| original | 1400–1500 mm WC |
| 30° C. wash 1 × | 1000–1100 mm WC |
| 30° C. wash 3 × | 800–900 mm WC |
| dry cleaning 1 × | 950–1050 mm WC |
| dry cleaning 3 × | 650–750 mm WC |
| Permeability to water vapor | 10 mg/cm² · h |
| Scrubb test, 1000 strokes, wet | no damage |

EXAMPLE 4

I. Preparation of the polyurethane urea solution (A)

1750 g of the polyester described in 1/I, 275 g of a polyester of ethylene glycol and phthalic acid (OH number 112) and 3.5 g of dimethylol propionic acid were reacted with 680 g of 4,4-diisocyanatodicyclohexylmethane at 80°–90° C. until an NCO content of 4.9% (calculated 4.95%) was reached. The NCO prepolymer was diluted with 325 g of toluene and 1000 g of methylethylketone. A solution of 60 g of ethylene diamine and 28 g of hydrazine hydrate in 2250 g of isobutanol was added dropwise at room temperature. When the viscosity of the solution had risen to 40,000 mPas, the polyaddition reaction was stopped by addition of 20 g of butanone oxime. The 30% solution had a viscosity of approx. 35,000 mPas at 25° C.

II. Preparation of the undercoat paste 1000 g of the solution described in 4/I were diluted with 300 g of ethylacetate. 15 g of a polyaziridine (as described in German Patent Application P No. 3,415,920.7, Example 3/IV) and 4.0 g of a 10% aqueous solution of N-methyl tripropanolamine were added to this solution. 700 g of water were then incorporated. The approx. 15% spreading paste had a viscosity of 12,000 mPas at 25° C.

III. Preparation of the top coat paste 1000 g of the solution described in 4/I were diluted with 350 g of toluene. 20 g of the 50% aqueous melamine resin described in 1/II and 4.0 g of a 10% aqueous solution of N-methyl-bis-propanolamine were added to this solution. An approx. 14% spreading paste (viscosity approx. 10,000 mPas) was obtained by incorporation of 800 g of water.

IV. Direct coating

After hydrophobicizing as in 3/V, blended fabrics of cotton and polyester (weighing approx. 130 g/m²) were coated while moist with the undercoat paste 4/II in the same way as described in 3/V. The top coat paste 4/III was then applied by doctor rolls in the second spreading unit, again as described in 3/V.

| | Polyester/cotton |
| --- | --- |
| Total coating weight | 28 g/m² |
| Resistance to water | |
| original | 1500 mm WC |
| 30° C. wash 1 × | 1000 mm WC |
| 30° C. wash 3 × | 850 mm WC |
| dry cleaning 1 × | 900 mm WC |
| dry cleaning 3 × | 700 mm WC |
| Permeability to water vapor | 9 mg/cm² · h |
| Scrubb test, 1000 strokes, wet | No damage |

EXAMPLE 5

I. Preparation of the polyurethane urea solution (A)

1400 g of a 1,6-hexane diol polycarbonate (OH number 56), 138 g of a dian* initiated polypropylene glycol polyether (OH number 220) and 3.5 g of dimethylol propionic acid were reacted with 532 g of isophorone diisocyanate at 80°–90° C. until an NCO content of 5.5% (calculated 5.65%) was reached.
*=4,4'-dihydroxydiphenyl-[2,2]-dimethylmethane The NCO prepolymer was dissolved in 2600 g of toluene and 1000 g of methylethylketone and then reacted at room temperature with a solution of 152 g of 1,4-cyclohexane diamine in 1600 g of isobutanol. After a viscosity of 25,000 mPas/25° C. had been reached, the polyaddition reaction was stopped by addition of 20 g of butanone oxime. The solution had a solids content of approx. 30%.

II. Preparation of the undercoat and top coat paste 1000 g of the solution described in 5/I were diluted with 750 g of methylisobutylketone. After the addition of 3.0 g of a 10% solution of N-methyl morpholine in water, 800 g of water were incorporated. 20 g of a 75% solution of a polyisocyanate in xylene/methoxypropylacetate (1:1) were homogeneously dispersed in this spreading paste before processing. (The polyisocyanate was Desmodur N, a biuret polyisocyanate based on 1,6-hexane diisocyanate and produced by Bayer AG, D-5090 Leverkusen).

The coating articles prepared with this spreading paste were distinguished by particularly good adhesion of the polyurethane to the substrate and by very high solvent resistance of the polyurethane layer.

EXAMPLE 6

I. Preparation of the polyurethane urea solution (A)

1530 g of a polyester of 1,6-hexane diol-neopentyl glycol (glycol ratio 65:35) and adipic acid (OH number 66), 110 g of an α,ω-bis-hydroxymethylpolydimethyl siloxane (OH number 100) and 3.5 g of dimethylol propionic acid were reacted with 800 g of 4,4'-diisocyanatodiphenylmethane at 90° C. until an NCO content of 7.5% was reached. The NCO prepolymer was diluted with 1500 g of methylethylketone, after which 116 g of ethylene glycol were added. The product was stirred at 80° C. until an NCO content of 0.7% was reached. After dilution with 4250 g of methylethylketone, a solution of 15 g of hydrazine hydrate in 250 g of water was added dropwise at room temperature. After stirring for several hours, a 30% ointment-like cloudy-paste was obtained.

II. Preparation of the polyurethane solution (B)

1700 g of the polyester used in 6/I, 3.5 g of dimethylol propionic acid, 800 g of 4,4'-diisocyanatodiphenylmethane, 116 g of ethylene glycol and 15 g of hydrazine hydrate were reacted in 5850 g of methylethylketone and 250 g of water as in 6/I to form a 30% ointment-like paste.

III. Preparation of the undercoat paste 950 g of the polyurethane urea solution (A) (6/I) were mixed with 50 g of solution (B) (6/II). After dilution with 300 g of toluene, 15 g of a blocked polyisocyanate according to 1/II and 15 g of a 50% melamine resin according to 1/II were added and the COOH groups were neutralized with 5 g of a 10% triethanolamine solution in water. An ointment-like, two-phase paste having a solids content of approx. 15% was formed by the incorporation of 800 g of water.

IV. Preparation of the top coat paste 1000 g of a mixture of (A)+(B) as in 6/III were diluted with 300 g of hexane. After the addition of 20 g of a 50% melamine resin according to 1/II, the COOH groups were neutralized with 5 g of a 10% triethanolamine solution in water. A two-phase spreading paste was formed by the incorporation of 800 g of water.

V. Direct coating

Using the undercoat paste 6/III and the top coat paste 6/IV, soft coatings permeable to water vapor were formed on fabrics of natural and synthetic fibers (cotton and polyester) by the procedure described in Example 1.

Permeability to water vapor: 4–7 mg/cm$^2$h.
Resistance to water: 1200 mm WC

EXAMPLE 7

I. Preparation of the polyurethane urea solution (A)

850 g of polytetramethylene glycol ether (OH number 112) and 82 g of α,ω-bis-hydroxymethyl-polydimethyl siloxane (OH number 200) were reacted with 625 g of 4,4'-diisocyanatodiphenylmethane at 90° C. until an NCO content of 8.0% was reached. The NCO prepolymer was diluted with 1200 g of methylisobutylketone, 71 g of ethylene glycol were added and the mixture was allowed to react at 80° C. until the NCO content had fallen to 1.3%. After dilution with 800 g of methylisobutylketone and 1500 g of methylethylketone, a solution of 34 g of 1,4-cyclohexane diamine and 5.0 g of sodium lysine in 350 g of water was added dropwise at 20° C., which resulted in the formation of a 30% whitish, ointment-like paste.

II. Preparation of the undercoat paste 15 g of the blocked polyisocyanate according to 1/II and 15 g of the 50% melamine resin according to 1/II were added to 1000 g of the polyurethane urea solution 7/I after dilution with 300 g of toluene. An approx. 15% spreading paste was then formed by the incorporation of 800 g of water.

III. Preparation of the top coat paste 20 g of a 50% melamine resin according to 1/II were added to 1000 g of the polyurethane urea solution 7/I after dilution with 300 g of cyclohexane. The spreading paste was then formed by incorporation of 800 g of water in the same way as in 7/II.

IV. Direct coating

Same as in 6/V.

EXAMPLE 8

I. Preparation of the PUR solution (A)

900 g of polytetramethylene ether glycol (OH number 112) and 55 g of α,ω-bis-hydroxymethyl-polydimethyl siloxane (OH number 200) were reacted with 625 g of 4,4'-diisocyanatodiphenyl-methane at 90° C. until the NCO content had fallen to 7.9%. The NCO prepolymer was diluted with 1200 g of methylethylketone and, after the addition of 68 g of ethylene glycol and 3.0 g of N-methyldiethanolamine was left to react at 80° C. until an NCO content of 1.7 % was reached. 3.0 g of dimethylsulfate in 100 g of methylethylketone were then added for quaternization. After dilution with another 2400 g of methylethylketone and cooling to 20° C., a solution of 20 g of hydrazine hydrate in 200 g of water was added dropwise, which resulted in the formation of an approx. 30% whitish, ointment-like paste.

II. Preparation of the undercoat paste 15 g of the blocked polyisocyanate according to 1/II and 15 g of the 50% melamine resin according to 1/II were added to 1000 g of the polyurethane urea solution 8/I after dilution with 300 g of methylacetate. An approx. 15% spreading paste was then formed by the addition of 800 g of water.

III. Direct coating

Same procedure as in Example 1.

Under coating was carried out with the undercoat paste 8/II containing cationic groups. The top coat was applied from the top coat paste 2/IV containing anionic groups.

Total coating weight: 30 g/m$^2$
Permeability to water vapor: 6 mg/cm$^2$.h
Resistance to water: 1400 mm WC

EXAMPLE 9

I. Preparation of the PUR solution (A)

1750 g of the polyester described in 1/I, 150 g of the α,ω-bis-hydroxymethylpolydimethyl siloxane described in 2/I and 50 g of a basic polycarbonate (prepared from 2 moles of a 1,4-butane diol polyadipate, OH number 124, 1 mole of N-methyl-bis-(3-aminopropyl)amine and 2 moles of diphenylcarbonate, OH number 56) were reacted with 580 g of isophorone diisocyanate at 100° C. until an NCO content of 5.3% was reached. After dilution of the NCO prepolymer with 3000 g of toluene and 2000 g of methylethylketone and cooling of the solution to 20° C., a solution of 270 g of isophorone diamine in 1500 g of isobutanol was added dropwise to synthesize the polyurethane urea. A 30% solution having a viscosity of 25,000 mPas at 25° C. was obtained.

II. Preparation of the undercoat and top coat paste 1000 g of the polyurethane urea solution 9/I were diluted with 400 g of toluene. 15 g of the blocked polyisocyanate according to 1/II and 20 g of the melamine resin according to 1/II and 50 g of 10% aqueous acetic acid were then added to the solution. To prepare the spreading paste, 800 g of water were introduced in portions with stirring. The paste had a solids content of approx. 14%.

EXAMPLE 10

I. Preparation of the PUR solution (A)

2130 g of the polyester described in 1/I and 82 g of the bis-hydroxymethylpolydimethyl siloxane described in 2/I were reacted with 655 g of 4,4'-diisocyanatodicyclohexylmethane at 100° C. until an NCO content of 4.4% was reached. After dilution of the NCO prepolymer with 2800 g of toluene and 800 g of isobutanol, a solution of 238 g of isophorone diamine and 3.5 g of N-methyl-bis-(3-aminopropyl)-amine in 2200 g of isobutanol was added at 20° C. When the viscosity had reached 40,000 mPas/20° C., 10 g of butanone oxime were added and the solution was heated for 30 minutes to 80° C. The 35% solution had a viscosity at 25° C. of 36,000 mPas.

II. Preparation of the undercoat and top coat paste 1000 g of the polyurethane urea solution 10/I were diluted with 500 g of toluene. 20 g of the blocked polyisocyanate according to 1/II and 20 g of the melamine resin according to 1/II and 30 g of a 10% lactic acid solution were then added. To prepare the paste, 900 g of water were mixed in. The paste had a concentration of approx. 15%.

EXAMPLE 11

1. Preparation of the PUR solution (A)

1750 g of the polyester described in 1/I, 150 g of the α,ω-bis-hydroxymethylpolydimethyl siloxane described in 2/I and 10 g of the sodium salt of the diol sulfonic acid according to DOS 3,134,161, Example 1, were reacted with 680 g of 4,4'-diisocyanatodicyclohexylmethane at 100° C. until an NCO content of 5.2% was reached. The NCO prepolymer was dissolved in 3400 g of toluene and reacted at 20°-30° C. with 270 g of isophorone diamine in 3300 g of isobutanol to form the polyurea. The 30% solution had a viscosity of approx. 35,000 mPas.

II. Preparation of the undercoat and top coat paste 1000 g of polyurethane urea solution 11/I were diluted with 400 g of xylene. After the addition of 15 g of the blocked polyisocyanate according to 1/II and 10 g of melamine resin (melamine hexamethylolmethylether (approx. 100% solids), 800 g of water were stirred in to prepare the paste. The paste had a concentration of approx. 14,5% and a viscosity of approx. 10,000 mPas/25° C.

EXAMPLE 12

I. Preparation of the polyurethane urea solution (A)

1600 g of a polyester of 1,6-hexane diol-neopentyl glycol (glycol ratio 65:35) and adipic acid (OH number 56) and 220 g of the α,ω-bis-hydroxymethylpolydimethyl siloxane described in Example 6/I were reacted with 620 g of isophorone diisocyanate at 100° C. until an NCO-value of 6.2% was reached. After the NCO prepolymer had been dissolved in 3200 g of toluene, a solution of 305 g of isophorone diamine in 3200 g of isobutanol and a solution of 38 g of N-(2-amino)-taurine-sodium in 100 g of water were simultaneously added dropwise at 20°-30° C., which resulted in the formation of a 30% solution having a viscosity of approx. 35,000 mPas/25° C.

II. Preparation of the undercoat and top coat paste 1000 g of polyurethane urea solution 12/I were diluted with 500 g of cleaning spirit. After the addition of 15 g of a blocked polyisocyanate and 10 g of a melamine resin according to 11/II, 750 g of water were added to the product. The approx. 14% spreading paste had a viscosity of approx. 15,000 mPas/25° C.

EXAMPLE 13

I. Preparation of the polyurethane urea solution (A)

1100 g of the 1,6-hexane diol polycarbonate described in Example 5/I, 640 g of dihydroxypolypropylene glycol (OH number 40), 110 g of α,ω-bis-hydroxymethylpolydimethyl siloxane (OH number 200) and 3.5 g of N-bis-(2-hydroxyethyl)-glycine were reacted with 655 g of 4,4'-diisocyanatodicyclohexylmethane at 80° C. until an NCO value of 5.0% was reached. The NCO prepolymer was dissolved in 3200 g of toluene and then reacted at 20° C. with 255 g of isophorone diamine in 3100 g of isobutanol and 100 g of water to form the polyurethane urea. The 30% solution had a viscosity of approx. 40,000 mPas/25° C.

II. Preparation of the undercoat and top coat paste 1000 g of polyurethane urea solution 13/I were diluted with 400 g of cleaning spirit and 100 g of Solvesso ® 100. After the addition of 750 g of water, 15 g of the blocked polyisocyanate according to 1/II and 20 g of the melamine resin according to 1/II were stirred into the two-phase system. The spreading paste had a viscosity of approx. 20,000 mPas/25° C.

Solvesso ® -100 is an aromatic hydrocarbon mixture.

EXAMPLE 14

I. Preparation of the polyurethane urea solution (A)

1500 g of dihydroxypolycaprolactone (started with diethylene glycol, OH number 56), 122 g of -bis-hydroxymethylpolydimethyl siloxane (OH number 200) and 6.0 g of N-bis-(3-aminopropyl)-β-alanine were reacted with 575 g of isophorone diisocyanate at 80° C. until an NCO content of 6.0% was reached. After dilution with 3000 g of toluene, a solution of 380 g of 3,3'-dimethyl-4,4'-diaminodicyclohexylmethane in 3000 g of isobutanol as chain extender was added dropwise at 20° C., which resulted in the formation of a 30% polyurea solution having a viscosity of 35,000 mPas at 25° C.

II. Preparation of the undercoat and top coat paste 1000 g of solution 14/I were converted as in 13/II into a two-phase spreading paste having a viscosity of approx. 15,000 mPas at 25° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An optionally pigmented spreading paste which is a multiphase mixture comprising
   (A) about 5 to 50% by weight of a hydraulic polyurethane and/or polyurethane urea containing about 0.01 to 0.5% by weight of chemically incorporated groups convertible into salts wherein at least a portion of said groups are present in salt form and about 1 to 30% by weight of a synthesis component containing at least two terminal and/or lateral NCO-reactive groups and comprising a silicone resin, an aromatic hydroxypolyether, an aromatic hydroxypolyester or a perfluorocarbon resin or mixtures thereof,
- (B) 0 to about 30% by weight of a hydraulic polyurethane and/or polyurethane urea containing about 0.01 to 0.5% by weight of groups convertible into salts wherein at least a portion of said groups are present in salt form and which do not contain said synthesis component,
- (C) about 5 to 50% by weight of an organic solvent for (A) and (B),
- (D) 0 to 40% by weight of an organic non-solvent for (A) and (B),
- (E) 0 to about 5% by weight of a crosslinking agent or a hydrophobicizing agent and
- (F) about 10 to 70% by weight of water.

2. The spreading paste of claim 1 wherein said groups are carboxylic acid groups, sulphonic acid groups or mixtures thereof.

3. The spreading paste of claim 1 wherein said groups are tertiary nitrogen atoms.

4. The spreading paste of claim 2 wherein said carboxylic acid groups or said sulphonic acid groups are incorporated using compounds containing at least two NCO-reactive groups.

5. The spreading paste of claim 3 wherein said tertiary nitrogen atoms are incorporated using a compound containing at least two NCO-reactive groups.

6. The spreading paste of claim 1 wherein said synthesis component is a polysiloxane.

7. The spreading paste of claim 1 wherein said synthesis component is a hydroxypolyether produced by alkoxylating an aromatic compound containing at least two phenolic hydroxyl groups wherein less than 10% by weight of said hydroxypolyether is made up of oxyethylene segments, —$CH_2$—$CH_2$—O—.

8. The spreading paste of claim 1 wherein said synthesis component is a hydroxypolyester based on a benzene dicarboxylic acid.

9. The spreading paste of claim 1 wherein said synthesis component is a compound containing perfluoroalkyl groups.

10. The spreading paste of claim 1 wherein said organic solvent (C) is an alcohol-and/or ketone containing 4 to 6 carbon atoms.

11. The spreading paste of claim 1 wherein said organic non-solvent (D) is an aromatic and/or aliphatic hydrocarbon containing from 6 to 11 carbon atoms, a fatty acid ester containing from 3 to 7 carbon atoms or mixtures thereof.

12. An optionally pigmented spreading paste based on a multiphase mixture comprising
- (A) about 5 to 30% by weight of a hydrophobic polyurethane urea which comprises the reaction product of
  - (1) about 10 to 40% by weight of an organic polyisocyanate,
  - (2) about 40 to 80% by weight of an aliphatic polyhydroxyl compound having a molecular weight of about 600 to 5000,
  - (3) a compound having a molecular weight of about 120 to 399, containing at least two NCO-reactive groups and either
    - (i) at least one carboxylic acid group or at least one sulphonic acid group, said groups being at least partially converted into salt form, said compound being present in an amount sufficient to provide about 0.01 to 0.5% by weight of said carboxylic acid groups or said sulphonic acid groups or
    - (ii) at least one tertiary amino group which has at least partially been converted into salt form, said compound being present in an amount sufficient to provide about 0.03 to 0.25% by weight of said tertiary amino groups.
  - (4) about 1 to 18% by weight of a synthesis component comprising
    - (a) 0 to about 15% by weight of a dihydroxymethylpolydimethyl siloxane having a molecular weight of about 300 to 3000,
    - (b) 0 to about 15% by weight of an alkoxylated bis-(hydroxyphenyl)-alkane having a molecular weight of about 300 to 2000 and containing less than 10% by weight of oxyethylene segments, —$CH_2$—$CH_2$—O—,
    - (c) 0 to about 15% by weight of a polyester based on an isomer of phthalic acid having a molecular weight of about 250 to about 2000,
    - (d) 0 to about 15% by weight of a diol containing perfluoroalkyl groups with at least three perfluronated carbon atoms and having a molecular weight of about 300 to 2000 and
    - (e) mixtures thereof,
  - (5) a chain extending agent comprising
    - (a) 0 to about 20% by weight of a polyhydroxyl compound having a molecular weight of 62 to about 300 and
    - (b) about 2 to 20% by weight of a compound having a molecular weight of 32 to about 300, said compound comprising a polyamine, hydrazine, a hydrazine derivative, or mixtures thereof,
  the percentages of synthesis component (3) to (5) being about 3 to 20% by weight, based on the weight of (A)
- (B) 0 to about 20% by weight of a polyurethane urea which satisfies the requirements of (A), but does not contain component 4,
- (C) about 5 to 40% by weight of an alcohol and/or ketone containing 4 to 6 carbon atoms,
- (D) about 5 to 40% by weight of an aromatic and/or aliphatic hydrocarbon containing 6 to 11 carbon atoms, a fatty acid ester containing from 3 to 7 carbon atoms or mixtures thereof,
- (E) 0 to about 5% by weight of a crosslinking agent or hydrophobicizing agent and
- (F) about 20 to 60% by weight of water.

13. A process for the preparation of a coating permeable to water vapor on a fabric or leather substrate which comprises applying the spreading paste of claim 1 to said fabric or leather substrate by the direct or transfer method and curing the coating using the technique of evaporation coagulation.

* * * * *